United States Patent [19]

McLoughlin et al.

[11] Patent Number: 4,729,920

[45] Date of Patent: Mar. 8, 1988

[54] CURABLE FABRIC

[75] Inventors: Robert H. McLoughlin, Swindon; Kenneth B. Pithouse, South Marston; David J. Barker, Faringdon, all of England

[73] Assignee: Raychem Limited, United Kingdom

[21] Appl. No.: 829,849

[22] Filed: Feb. 14, 1986

Related U.S. Application Data

[63] Continuation of Ser. No. 583,458, Feb. 24, 1984, abandoned.

[30] Foreign Application Priority Data

Feb. 25, 1983 [GB] United Kingdom ................ 8305313

[51] Int. Cl.$^4$ .................... B32B 27/02; B32B 27/08; D03D 15/04
[52] U.S. Cl. ..................... 428/229; 428/224; 428/253; 428/254; 428/261; 428/290; 428/913; 428/35; 428/36; 156/85; 156/86; 264/342 R
[58] Field of Search ................ 428/35, 36, 229, 253, 428/254, 265, 320.2, 261, 273, 290, 224; 156/85, 86, 161, 307.7; 174/84 R, DIG. 8; 285/381; 264/342 R

[56] References Cited

U.S. PATENT DOCUMENTS

| | | | |
|---|---|---|---|
| 2,641,004 | 6/1953 | Whiting et al. | 428/224 |
| 3,409,497 | 11/1968 | Roseland | 428/396 |
| 4,024,002 | 5/1977 | Lott | 156/85 |
| 4,264,659 | 4/1981 | Pattenden | 428/265 X |
| 4,271,329 | 6/1981 | Perelmuter | 428/36 |
| 4,427,725 | 1/1984 | Crofts | 428/36 |
| 4,569,884 | 2/1986 | Weinand et al. | 428/265 X |
| 4,576,666 | 3/1986 | Harris et al. | 156/85 |
| 4,624,720 | 11/1986 | Pithouse et al. | 156/86 |
| 4,626,458 | 12/1986 | Pithouse et al. | 428/36 |
| 4,631,098 | 12/1986 | Pithouse et al. | 156/86 |

FOREIGN PATENT DOCUMENTS

| | | | |
|---|---|---|---|
| 0012542 | 6/1980 | European Pat. Off. | 428/537.5 |
| 0023101 | 1/1981 | European Pat. Off. | 428/224 |
| 0048177 | 3/1982 | European Pat. Off. | 428/35 |
| 3150554 | 6/1983 | Fed. Rep. of Germany | 156/85 |
| 8000847 | 5/1980 | PCT Int'l Appl. | 428/447 |
| 1056899 | 2/1967 | United Kingdom | 428/224 |
| 1088572 | 10/1967 | United Kingdom | 156/85 |
| 1124781 | 8/1968 | United Kingdom | 428/224 |
| 1209839 | 10/1970 | United Kingdom | 156/85 |
| 1252805 | 10/1971 | United Kingdom | 525/123 |
| 1293353 | 10/1972 | United Kingdom | 428/289 |
| 1308912 | 3/1973 | United Kingdom | 428/35 |
| 1440524 | 6/1976 | United Kingdom | 156/85 |
| 1452785 | 10/1976 | United Kingdom | 156/85 |
| 1495028 | 12/1977 | United Kingdom | 156/85 |
| 1497051 | 1/1978 | United Kingdom | 156/85 |
| 1506242 | 4/1978 | United Kingdom | 156/85 |
| 1508951 | 4/1978 | United Kingdom | 156/86 |
| 1526424 | 9/1978 | United Kingdom | 156/85 |
| 1562050 | 3/1980 | United Kingdom | 428/289 |
| 1570991 | 7/1980 | United Kingdom | 428/289 |
| 1587536 | 4/1981 | United Kingdom | 428/537.5 |
| 2076694 | 12/1981 | United Kingdom | 156/85 |
| 2023147 | 9/1982 | United Kingdom | 428/375 |
| 2097401 | 11/1982 | United Kingdom | 428/83 |
| 2104800 | 3/1983 | United Kingdom | 156/85 |

OTHER PUBLICATIONS

Verpackungs-Rundschau 29 (1978) Nr. 5, Techn.-wiss. Beilage, pp. 33–39, "Untersuchugen uber die Gebrauchseigenschaften von Schrumpffolien fur die Verpackungstechnick".

Primary Examiner—Joseph L. Schofer
Assistant Examiner—F. M. Teskin
Attorney, Agent, or Firm—Yuan Chao; Edith A. Rice; Herbert G. Burkard

[57] ABSTRACT

Curable fabric comprising first and second curing reactants, at least one of which is in the form of a fabric member, and comprising heat-recoverable fabric members.

18 Claims, No Drawings

CURABLE FABRIC

This application is a continuation of application Ser. No. 583,458, filed 2/24/84, now abandoned.

This invention relates to curable fabrics and to fabric members for use therein. These fabrics may, for example, be useful as an adhesive sealing layer between an electrical conductor and a dimensionally-recoverable (preferably heat-recoverable) insulating sleeve to be recovered thereon.

A heat-recoverable article is an article the dimensional configuration of which may be made substantially to change when subjected to heat treatment.

Usually these articles recover, on heating, towards an original shape from which they have previously been deformed, but the term "heat-recoverable", as used herein, also includes an article which, on heating, adopts a new configuration, even if it has not been previously deformed. References hereinafter to "unresolved recovery" mean the proportion of dimensional recovery actually achieved to the maximum possible, i.e. complete recovery to original dimensions.

In their most common form, such articles comprise a heat-shrinkable sleeve made from a polymeric material exhibiting the property of elastic or plastic memory. The original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above a transition temperature thereof, for example, the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat to raise the temperature above the transition temperature will cause the article to assume its original heat-stable shape.

Where the term "recovery temperature" in connection with heat-recoverable articles is used herein, it is intended to refer to the transition temperature above which the article recovers even if some small degree of recovery is exhibited at temperatures slightly below the transition temperature.

In other known articles, an elastomeric member such as an outer tubular member is held in a stretched state by a second member, such as in inner tubular member, which, upon heating weakens and thus allows the elastomeric member to recover.

Articles of this type have, in recent years, become widely used in a number of applications, for example for protecting objects such as electrical cables and cable splices or metal pipes from corrosion or other damage, for example damage caused by penetration of moisture. For this reason many heat-recoverable articles are provided with a coat of adhesive or sealant.

One problem that is associated with the provision of adhesives on heat-recoverable articles is that, because the heat required to melt or otherwise activate the adhesive is usually supplied by heating the external surface of the heat-recoverable article, the temperature to which the adhesive is heated will be considerably lower than that of the external surface of the article due to the relatively poor thermal conductivity of the materials from which the heat-shrinkable article is formed. Thus, for example, where the heat-shrinkable article is formed from a cross-linked polyethylene, the external surface of the article may be heated up to about 250° C. in order to raise the adhesive temperature to only 100° C., and, in this case, no further heating of the article would be possible without damaging the article. Also, in many cases, the maximum temperature to which the adhesive can be raised is restricted by the type of substrate that is being covered. For example, where the substrate is a metal pipe, the thermal conductivity and size of the pipe cause it to act as a heat-sink and effectively limit the adhesive temperature and, where the substrate comprises an uncrosslinked polymer as is often the case with electrical cable jackets, the adhesive temperature often cannot be raised above about 100° to 120° C. without damaging the cable jacket.

Whilst hot-melt adhesives or mastics can be used in a number of applications, the maximum temperature to which the article may be subjected after installation is usually limited to the melting or softening point of the adhesive.

Curable fabrics are known, for example from U.S. Pat. No. 4,271,329, but such known fabrics tend not to produce a satisfactory level of cure when used as discribed in the patent under a heat-recoverable sleeve, especially when curing components of only moderate reactivity are used to suit particular requirements.

The present invention provides a fabric comprising dimensionally-recoverable fabric members with fabric carries first and second components of an adhesive composition which can be cured by reaction together of the first and second components, at least the first component being in the form of fabric members.

The fabric according to this invention can advantageously combine the functions of a sealing layer and a dimensionally-recoverable member or can provide a sealing layer capable of following or matching the recovery of an overlying recoverable sleeve. Preferably both of the first and second components are in the form of fabric members, and preferably the adhesive component(s) in the form of fabric members is or are incorporated into the fabric with the recoverable fabric members.

In a preferred form of the invention a recoverable fabric member incorporates one or both of the adhesive components. The curable fabric can accordingly be made from two kinds of recoverable fabric member respectively incorporating the first curable component and the second curable component, or the fabric can be made from a single kind of recoverable fabric member incorporating both curable components, or mixtures of such fabric members with one another or with other kinds of fabric member could be used.

The recoverable fabric members incorporating one or both of the curable components, which are in themselves as aspect of the present invention, can be formed by coating the curable component(s) onto a suitable recoverable fabric member, e.g. by extrusion or solvent coating in sequential layers, or by coextrusion. Concentric arrangment of the curable and recoverable components may be most convenient in practice, but other arrangements wherein the respective components are each exposed on part of the surface, for example occupying a sector each of a circular cross-section of the fabric member, can also be used.

It has unexpectedly been found that improved levels of cure can be obtained when fabrics according to this invention are recovered, or when a heat-recoverable article is recovered over the fabric. It will be understood that "curing" as used herein is not restricted to systems which form rigid chemical crosslinks, provided that the components react together when suitably stimulated, e.g. by heating, to produce a significant increase in viscosity, an example being the polyamide/EVA mixtures which produce such an increase by hdrogen bonding as described in U.S. Pat. No. 4,018,733.

References herein to "fabric members" are intended to include fibres, filaments and yarns which may incorporate one or both of the curing components in addition to a heat-recoverable component. One or both of the curing components could, if desired, be the recoverable members, but it may be preferable to use a separate recoverable member in addition to the curable components.

The respective recoverable and curable components of the fabric may be provided in the form of continuous filaments, which may be used as such or may be incorporated into yarns containing one or both kinds of the individual component filaments. The components may also be provided in the form of short staple fibres which may be spun into yarns containing one or both kinds of the individual component staple fibres. Yarns, fibres and filaments of different kinds may be combined in the fabric if desired, for example by using spun yarns containing one of the components with continuous filament yarns containing the other of the components, or by using a yarn containing equal weight of both of the components with continuous filaments of one of the components where an excess of one of the component over the other is desired.

The curable components of the adhesive composition may be selected according to requirements from known curable systems, provided that at least one, preferably both, of the components can be formed into fibres or filaments suitable for use as the fabric memebers. Curable materials which are difficult in themselves to spin or extrude into fibres or filaments may be prepared in suitable physical form by means of a support member such as a central strengthening strand or filament, e.g. a 0.1 mm glass or polyester filament, onto which the curable material may be coated, e.g. by extrusion. Alternatively, brittle materials, e.g. epoxies, may be advantageously be formed into two-component fabric memebrs in which the other component is a flexible material, e.g. a polyamide, so that the resulting two-component fabric member can be machine woven or knitted, despite the difficulty or impossibility of machine processing fabric members formed of the brittle material alone.

Preferably the curing components are such that, if they are brought together into intimate contact for example by dissolving them in a common solvent, they will react together even at room temperature to form a cured product so that curing of the adhesive composition on the article during storage is prevented substantially solely by the physical separation of the components.

In a number of cases it has been found that when a heat-recoverable article is recovered onto a substrate with a fabric according to the invention between the article and the substrate, the adhesive will cure sooner than if it is heated on its own to the same temperature, or will cure at a significantly lower temperature than it will when heated on its own. The fabric may be carried by the recoverable article or may be applied separately to the substrate then overlaid with the recoverable article. Thus it has been found that it is possible, according to the invention, to provide an adhesive coated heat-recoverable article in which the adhesive can be cured by heating the article to its recovery temperature for periods in the range of the recovery time of the article, but which will also have good storage life.

The rate of curing of curable adhesives at elevated temperatures is linked to their rate of curing at ambient temperatures, and hence their storage life, by the Arrhenius equation which effectively imposes a limit on the rate of cure of an adhesive at the usual recovery temperature of a heat-shrinkable article (about 100° to 120° C.) for any given storage life at ambient temperatures or vice versa. It can be shown from the Arrhenius equation that any curable adhesive that cures sufficiently rapidly at the recovery temperature of the article should suffer from a poor storage life or that an adhesive that does have a long storage life should not cure sufficiently rapidly at the recovery temperature of the article. However, according to the invention it is possible to overcome this problem by virtue of the synergistic increase in the rate of curing of certain adhesives when used in conjunction with a recoverable article.

This synergistic effect is most pronounced when the fusion temperature of the components is in the region of the recovery temperature of the article or the temperature to which the adhesive is heated when the article is recovered. Preferably the fusion temperature is not more than 50°, especially not more than 30° and most especially not more than 10° C. above the recovery temperature of the article. Also, not more than one, and especially none, of the components has a fusion temperature of less than 50° C. Each of the components preferably has a fusion temperature in the range of 70° to 120° C. and most preferably from 70° to 100° C., and, instead or in addition, each has a fusion temperature that differs from the fusion temperature of the or each other reactive component by not more than 30° C.

In most instances the components will melt or soften at their fusion temperature although the term is intended to include sublimation of one or more components if this occurs.

In many cases the reactive components will soften and flow or otherwise fuse over a temperature range and the softening characteristics of the components may be observed by thermomechanical analysis (TMA) as described in "Thermal Analysis" by T. Daniels published by Kogan Page 1973. Accordingly, the fusion temperature or the melting point of the reactive components of the adhesive is defined herein as being the temperature at which the TMA probe has penetrated to 60% of the total thickness of the material, usually referred to as $T_{60}$. The TMA data described herein were obtained using a 6.35 mm diameter flat profile probe loaded with a 50 gramme weight and by increasing the temperature of the material at a rate of 10° C. per minute. Preferably the temperature at which reactive components of the adhesive initially become soft referred to as $T_i$ on the TMA plot) is not more than 30° C. below and especially not more than 25° C. below the metlting point ($T_{60}$) of the components so that the difference between the maximum storage temperature and the minimum curing temperature can be reduced as far as possible.

Another synergistic effect that may be shown by the articles according to the invention, either instead of or in addition to the increase in rate of cure of the adhesive, is an increase in the level of curing of the adhesive as compared with the adhesive on its own. The increase in level of curing leads to improved properties such as solvent resistance and improved high temperature properties such as high temperature shear strength.

The level of cure of the adhesive may be measured in a number of ways. For example, it may be measured as an increase in the $T_{60}$ (as defined above) or, more preferably the $T_{80}$ of the adhesive, where $T_{80}$ is defined as the temperature at which the TMA probe has penetrated to 80% of the total thickness of the adhesive. In some cases the composition will cure sufficiently to prevent the probe penetrating it by 80% in which case the total depth of penetration is a better measure of cure. Another measure of the level of cure of the adhesive is its gel content which is measured by weighing a quantity of the adhesive into an extraction thimble, refluxing the adhesive for 5 to 8 hours with a solvent (e.g. 1,2-dichloroethane or tetrahydrofuran), drying the thimble in an oven for 24 hours to evaporate the solvent and, after leaving the dried thimble in the atmosphere for a further 24 hours reweighing the thimble. The gel content is then defined as the final weight of the adhesive (which is insoluble) expressed as a percentage of the initial weight of the adhesive.

The adhesive fabric cures, as stated above, by reaction of a plurality of mutually reactive components. The phrase "mutually reactive components" is defined herein as meaning components which, when mixed together in dry particulate form, will react together at the fusion temperature thereof or at least at the highest fusion temperature thereof to form a composition having a $T_{80}$ value that is at least 20° C., preferably at least 30° C. and especially at least 40° C. above the initial fusion temperature of the blend. Preferably the components will exhibit a gel content of at least 5%, more preferably at least 10%, especially at least 20%.

Thus, another aspect of the invention provides a method of enclosing at least part of a substrate, which comprises:

(a) positioning thereon a dimensionally-recoverable article such that recoverable curable fabric members of fabric according to this invention is disposed between the article and substrate; and (b) recovering the article about the substrate and heating the fabric members or fabric to fuse the curable components, thus curing the fabric members or fabric. Alternatively, the recoverable curable fabric could, if suitably constructed, be used alone to enclose the substrate.

There is essentially no limit on the size of the reactive fabric members in that the fabric can still show a synergistic increase in rate and/or level of cure even with very large fabric members, although the absolute value of the cure rate may tend to decrease with large fabric members. The thickness of the fabric members does, however, affect the maximum fabric web density which can be achieved with a single woven layer of the fabric and it may therefore be necessary to use more than one such layer of the fabric to achieve the required minimum of the present invention if very thin fabric members are used. Preferably the fabric members will have a diameter of at least 0.2 mm, for example 0.25 to 0.3 mm, and more preferably at least 0.5 mm, for example 0.75 to 0.8 mm. It is to be understood that these references to diameter do not limit the fabric members to substantially circular cross-section, other cross-sections such as square, triangular, oval, hexagonal or indeterminate being perfectly acceptable provided they can be adeqately incorporated into the fabric.

The adhesive fabric may, if desired, consist solely of the reactive components and recoverable members although it is preferred for it to include one or more inert components. The inert components may be present in the reactive fabric components, or may be mixed with them or as a separate phase or both. For example, the adhesive may comprise a fabric member of curable resin such as an epoxy resin, preferably one based on bisphenol A or on epoxy novolak resin, as one component and a curing agent such as an amine, carboxylic acid, phenolic resin or isocyanate curing agent as the other. The curing agent may itself be a fabric member, for example it may be a fibre of polyamide having free amino groups or a carboxylated polymer such as an ethylene acid terpolymer, in which cast it need not contain any inert component. If the curing agent is not polymeric, for example an organic peroxide or other free radical initiator, it may be desirable for it to be blended with a polymeric material, e.g. a polyester or a reactive or unreactive polyamide before being formed into a fabric member. The curable resin may, instead, comprise a polyamide having free amine groups, in which case the curing agent preferably comprises a material having free or blocked isocyanate functional groups, e.g. a cresyl blocked isocyanate.

The polyamides that are most suitable for forming the reactive fabric members to act as one of the components are those that are conventionally used as hot-melt adhesives. These polyamides are characterized by the fact that their amide linkages are separated by an average of at least fifteen carbon atoms and have amorphous structures in contrast with the more highly crystalline, fibre forming polyamides such as nylon 6 or nylon 6.6. These nylons may, however, be useful as the heat-recoverable fabric members. The polyamides preferably have an amine number of at least 1, preferably at least 5.

Chemical curing accelerators may also be present in the adhesive, either blended with one of the reactive fabric memberes or as separate fabric members of particles, provided that they do not unacceptably increase the rate of cure at storage temperatures, thus unacceptably decreasing the storage life of the fabric. Examples of accelerators include dimethylaminopyridine, tris(-dimethylaminomethyl)phenol, tin octoate, imidazole or imidazole derivatives such as salts, substituted imidazoles or metal complexes thereof.

A number of inert components may be incorporated in the compositions as long as they do not adversely affect the formation of the required fabric members, and preferably do not affect the increase in rate or level of cure of the adhesive composition. Also it is preferred that they do not adversely affect the storage life of the adhesive.

Inert components that may be incorporated in the adhesive composition include plasticisers such as phthalates or rosin esters, thermoplastic or thermosetting polymers, cured or uncured rubbers, inorganic materials to modify the properties of the uncured or cured adhesive such as reinforcing fillers, reinforcing fibres or microspheres, or tackifiers and the like. The other components, whether organic or inorganic, may be in any appropriate physical form, for example they may be in the form of powder, flake or fibres, and are preferably present in an amount of from 5 to 50 percent by weight based on the total weight of the composition. In a preferred aspect of the invention the adhesive composition contains one or more other components having a softening temperature range (from the initial softening temperature to $T_{60}$) that is greater than that of the reactive components so that the softening temperature range of the adhesive composition as a whole is greater than that of the reactive components, preferably by at least 5° C. This has the advantage that, whilst the adhesive will cure when heated to only a relatively low temperature above the maximum storage temperature, it will possess cohesive and adhesive strength over a significantly greater temperature range. Alternatively, in some cases where the reactive components have a large softening temperature range it may be desirable to reduce the softening temperature range of the adhesive composition by incorporation of the appropriate components for example tackifier resins such as hydrogenated rosin esters and terpene phenols or polar waxes such as polyamide and polyester waxes.

As examples of other components that may be incorporated in the adhesive compositions subject to satisfactory formation of the fabric members, there may be mentioned tacky materials such as pressure sensitive adhesives or mastics, or thermoplastic materials. The components are preferably, although not necessarily, fluid at temperatures below the melting point of the reactive components, but if they are not they should be such as to allow the reactive components to mix together at the recovery temperature of the article.

The fabric according to the invention may be carried on recoverable articles in a number of configurations depending on the particular use. The articles may be in the form of a tube that has been extruded and expanded radially to render it heat-recoverable, the tube being either in continuous lengths or discrete pieces and carrying on its internal surface the fabric adhesive compositions. Alternatively, the articles may be in the form of a sheet or tape that can be wrapped or wound around an object. More complex shapes, commonly referred to as boots, transitions, udders or caps, may be formed by moulding the articles in the desired configuration and then expending them or by the methods described in our U.K. Published Patent Applications Nos. 2083403A and 2083859A. The fabric of the present invention is also suitable for the use on wrap-around devices. So called wrap-around devices are employed for sealing, insulating or otherwise protecting a substrate where the use of a preformed tubular article such as a sleeve is not possible or convenient e.g. in the case where the end of an elongate substrate is not accessible. In general, such wrap-around articles comprise at least a portion thereof which is adapted to be wrapped around a substrate to be covered and secured in tubular form by closure means. Thereafter, the wrap-around closure may be heat-recovered tightly onto the substrate by application of heat. Examples of wrap-around devices are known and one form of wrap-around device in which the curable fabric may be especially useful is that described in our U.K. Published Patent Application No. 2076694A, which comprises a layer of sealant that may be peeled away at any desired point to expose an underlying layer of a closure adhesive. The fabric of the present invention can be well adapted to such a peeling operation.

In hollow articles, either moulded as such or formed by wrapping, the fabric adhesive may be advantageously arranged as a ring at or near an aperture in the article to seal the aperture to a substrate about which the article is to be used.

Another preferred article which may carry the fabric according to the invention is in the form of a continuous tape or sheet, one surface of which carries the fabric. Such an article may be wound helically around a substrate for example a metal pipe which is preferably pre-heated, and the would portions of the tape or sheet may be heated to recover the tape or sheet and cure the fabric adhesive. Often it is desired to operate further on the pipe shortly after the protective article has been recovered thereon, for example to bury it in a pre-dug trench and, because of the rapid cure of the adhesive composition, it is possible to perform such operations only a few minutes after the tape or sheet according to the invention has been recovered thereon.

The curable fabric may be attached to the heat-recoverable article in a number of ways depending on the type of article and fabric. For example, where the article has an open, generally uniform configuration, it may be provided with a layer of tacky material for example pressure sensitive adhesive layer e.g. by spraying or in the form of a tape, and the curable fabric may be applied thereto by application of pressure, pressures in the order of 0.8 MPa (120 p.s.i.) and temperatures of about 15° to 30° C. having been found suitable in practice. Other methods such as welding or sewing may also be used to attach the fabric.

In another method of applying the fabric, the fabric members are mixed or coated with other components which preferably comprise or include a pressure-sensitive adhesive or a mastic and the whole composition is pressed onto the heat-recoverable article, the temperatures and pressures used preferably being the same as those mentioned above.

The fabric can, in the broadest aspect of the invention, be made solely of the curable and recoverable fabric members as described above or can contain other fabric members in addition to the curable members. The fabric can be knitted, woven, non-woven, braided, or the like. In non-woven fabrics, the aforementioned improvement in curing may be achieved regardless of whether or not the fabric members are arranged to cause dimensional recovery of the fabric as a whole. In a preferred embodiment the fabric is a woven fabric. The woven fabric can contain only curable and recoverable members or it can contain those members together with non-curable and non-recoverable fibres or filaments. For example, the fabric can contain curable fibres in one direction and non-curable recoverable strength fibres in the other. This produces a curable fabric which is especially strong and recovers in one direction. The fabric can be woven in a pattern, for example, twill, satin, sateen, Leno, plain, hop sack, sack, matt and various weave combinations in single or multiple ply weaves e.g. 2- or 3-ply weaves. The ratio of the reactive components is preferably stoichiometric 1:1, but may vary within the range from 1:9 to 9:1 to suit particular requirements of materials and level of cure. The fabric may alternatively be knitted if desired, either by warp knitting or weft knitting.

The adhesive components respectively may be arranged one on the weft and one in the warp, or various mixtures of components in the weft and/or warp may be used. According to yet another aspect, the fabrics of this invention may comprise three curable components of an adhesive composition that is novel per se comprising:

(a) a thermoplastic polyamide having reactive amine groups;

(b) a thermoplastic copolymer of an alkene, preferably ethylene, with an ethylenically unsaturated ester of an alkanol and a carboxylic acid, the ester having up to 6 carbon atoms, and optionally one or more acidic comonomers; and (c) a thermoplastic epoxy resin.

Components (a) and (b) are preferably present in a ratio of from 35:65 to 75:25, preferably from 35:65 to 65:35, more from 40:60 to 60:40 and especially from 45:55 to 55:45 by weight, and component (c) is preferably present in an amount of from 8 to 79 parts per hundred parts of (a) and (b) combined by weight. In this case each of components (a), (b) and (c) may be selected to react with the other two components when the composition is heated to above the melting points of the components, and at least one of the components, preferably all three, is or are in the form of fabric members incorporated in the fabric.

Component (b) preferably has an acid number of at least 1 and preferably also has an acid number of less than 100. The term "copolymer" as used herein in connection with component (b) is intended to include terpolymers and polymers containing four or more comonomers. The preferred comonomers are vinyl acetate and ethyl acrylate optionally with an unsaturated carboxylic acid e.g. acrylic acid. Examples of materials that may be used include those described in U.S. Pat. No. 4,018,733.

The epoxy used for component (c) may comprise any of a number of epoxies for example those based on novolak resins or on bisphenol A, and may have a wide range of epoxy values provided it remains thermoplastic. Any of the polyamides mentioned above will in general be suitable as component (a).

The components (a), (b) and (c) preferably each has a melting or softening point ($T_{60}$) in the range of from 60° to 120° C., more preferably from 70° to 120° C. and especially from 70° to 100° C.

The adhesive components used in the fabric according to the invention have a softening point that increases on application from the melting or softening points of the components, e.g. in the order of 90° to 95° C. to a value of about 130° to 140° C. or even higher and so combine low initial application temperatures with relatively high use temperatures. Furthermore, the cured fabric exhibits relatively high tensile and flexural strengths. In general, the recovery temperature of the recoverable fabric members (hereinafter referred to as "fibres" will be the crystalline melting temperature if the polymer is crystalline or the glass transition temperature if the polymer is amorphous.

Preferably the fibres ave a recovery temperature of at least 60° C., more preferably from 80° to 250° C. and especially from 120° to 150° C.

The heat-recoverable fibres, when not formed of the curable components, are preferably formed from a polymeric material that imparts good physical properties and, in particular, good creep resistance to the fibres. Olefin polymers such as polyethylene and ethylene copolymers, polyamides, polyesters, acrylic polymers and other polymers capable of being cross-linked may be employed. A particularly preferred polymeric material for the fibres is based on polyethylene having a density of from 0.94 to 0.97 /gms/cc, an Mw of from $80 \times 10^3$ to $200 \times 10^3$ and an Mn of from $13 \times 10^3$ to $30 \times 10^3$.

The fibres preferably have a minimum recovery stress of $10^{-1}$ MPa, more preferably $5 \times 10^{-1}$ and usually at least 1 MPa at a temperature above the transition temperature of the fibres. There is in theory no upper limit of recovery stress, but in practice 200 MPa and more usually 100 MPa is the highest figure normally achievable with polymeric fibres. The tensile strength of the fibres at their recovery temperature is preferably increased to 0.1 MPa or higher by cross-linking the polymeric material from which they are formed, either by chemical means or by irradiation e.g. high energy electron irradiation, gamma radiation or by ultra violet radiation.

When the fibre is cross-linked by irradiation it is convenient to incorporate the cross-linking step into manufacture of the fibre. The fibre can be extruded, stretched at a temperature below its melting temperature, for example by an amount of from 200 to 2000%, depending on end use, then subjected to irradiation to effect cross-linking. A less preferred way of making the fibre is to extrude the fibre, irradiate to cross-link, then heat the fibre, preferably to above its melting temperature, stretching the fibre, and then cooling the stretched fibre. High density polyethylene fibres are preferably irradiated with a dose of from about 5 to about 35 megarads, preferably from about 5 to about 25 megarads, and in particular from about 7 to about 18 megarads. Usually the gel content of the cross-linked fibre is greater than 20%, preferably greater than 30%, most preferably greater than 40%. In practice, gel contents greater than 90% are not easily achievable.

Instead of being woven, the fabric may alternatively be knitted if desired, either warp knitted or weft knitted. The heat-recoverable fibres may be arranged so that the fabric will be recoverable in two dimensions, but if, as is preferred for the knitted fabrics, it is knitted from curable fibres and a heat-recoverable fibre is either warp or weft inserted, it will be recoverable in only one direction.

The preferred fabric described above has the advantage that it may be recovered over a number of substrates such as cable splices and other substrates that contain transitions, that is, in which the substrate dimensions vary from one point to another, which have not been able to be enclosed by the previously proposed fabrics. However, fabrics having other recovery characteristics may be useful.

As stated above, the preferred fabric recovers on heating by at least 10% as appropriate for particular end uses, often by at least 40%, that is to say by at least 40% of its original dimension in the direction of recovery i.e. a recovery ratio of at least 1.67:1. In order to achieve any particular fabric recovery ratio the recovery ratio of the fibres will need to be somewhat higher although the exact degree of recovery of the fibres will depend also on the weave design as discussed below. For many applications the fabric preferably recovers by at least 50%, especially at least 60% and most especially at least 70% of its original dimensions. The recovery ratio of the recoverable fibres is preferably at least 2:1, more preferably at least 3:1 e.g. at least 5:1 and especially at least 8:1 although there is usually no advantage in having a recovery ratio of greater than 15:1.

The structure of the fabric may be adjusted to produce desired effects such as maximising the recovery, or restricting lateral movement of the recoverable fibres by selecting the weave type, fibre distribution, crimp, fibre size, weave density and other factors along the lines described in our copending British Patent Application No. 8236582.

For these purposes, it may be convenient that the fabric have a high float in the heat-recoverable fibre direction e.g. a float of at least 4 and especially from 6 to 15, in which case twill (including broken twill), satin, sateen and sack or plain weaves are preferred and especially satin. In addition or alternatively the heat-shrinkable fibres preferably have a low degree of crimp, the degree of crimp being the additional length of an individual fibre to form a given length of the fabric expressed as a percentage of the length of the fabric, the additional length of fibre being due to the serpentine path the fibre follows in the weave. Thus, a fibre which is completely straight has a crimp of 0%. Preferably, the crimp of the recoverable fibres is less than 50%, more preferably less than 30%, and especailly less than 20%. As will be appreciated, the crimp of the recoverable fibres will be decreased by inter alia increasing their float.

Another important feature is the nature of the aforementioned non-shrinkable fibres which may be present. Preferably, they have a stiffness at ambient temperatures that is less than the stiffness of the recoverable fibres since this disparity of stiffness will decrease the crimp of the recoverable fibres. Thus, heat-stable multifilament yarns are preferred to monofilaments in view of their reduced stiffness, and smaller fibres are also preferred, the heat-stable fibres or yarns preferably having a titre of less than 3000 dtex, and especially less than 1500 dtex although they will usually have a titre of at least 1000 dtex.

The fabric is advantageously constructed so as to reduce the lateral movement of the recoverable fibres at least at the recovery temperature of the fibres. Thus, preferably the fabric is contructed so that the heat-recoverable fibres will not move laterally by more than 10 times, especially not more than 5 times the temperature of the fibres when subjected to a lateral force per fibre equal to the recovery force of an individual fibre. For fibres of the type used in the Examples herein, this corresponds to distances of not more than 2 mm, especially not more than 1 mm. This construction has the further advantage that the fabric may be recovered over substrates containing transitions in whch the dimensions of the substrate vary discontinuously. An example of such a substrate is a cable splice liner having a central cylindrical portion of relatively large diameter and tapering end portions of generally frust-conical shape which form a sharp ridge where they join the central portion. In this case, the change in dimensions of the substrate are accommodated by the relatively high recovery ratio of the recoverable fibres and the heat-recoverable fibres, which extend circumferentially around the substrate, are prevented from shifting axially along the frusto-conical end portions towards those regions of smaller diameter (which tendency is caused by the unresolved recovery forces of the fibres).

The fabric may be designed in a number of ways to resist lateral movement of the recoverable fibres. For example, the fabric preferably has a high weave density of heat-recoverable fibres e.g. at least 20, more preferably at least 35 and most preferably at least 30 fibres per cm. in which case a relatively low weave density, e.g. less than 10 and preferably less than 5 fibres per cm. for the heat stable fibres is preferred. In any case, a higher weave density for the heat-recoverable fibres than for the heat-stable fibres is preferred. In order to achieve high weave densities for the heat-recoverable fibres, it is preferred that they be distortable, that is to say that, at least at the recovery temperature of the fibres, they are capable of being flattened slightly, e.g. by at least 20% under the same force as their recovery force. This property is desirable since the radial dimension of a recoverable fibre will increase by the same amount as its longitudinal contraction so that, for high weave densities, adjacent recoverable fibres will touch each other as they recoverable should therefore be able to increase in thickness in a direction normal to the plane of the fabric as they are "squashed" by each other. Examples or material from which such fibres may conventionally be formed are medium density and high density polyethylene. In addition, by employing a weave design in which the float of the recoverable fibres is high, as described above, the weave density of the recoverable fibres may be increased.

Another way in which the tendency of the recoverable fibres to shift laterally may be reduced is by employing a weave design having a high degree of crimp of the heat-stable fibres for example a crimp of at least 20%, preferably at least 30% and especially at least 40%. This may be achieved by using a weave design in which the heat-stable fibres have a low float, e.g. a float of 2 or 1. A high degree of crimp for the heat-stable fibres reduces the tendency of the recoverable fibres to shift laterally because the heat-stable fibres haver a more serpentine configuration which will beed to be disturbed in order for the recoverable fibres to shift. Also, the higher the weave density of heat-stable fibres, measured in fibres per cm, the less the tendency of the recoverable fibres to shift laterally. However, if pressure retention within a splice is of primary consideration, it may be beneficial to reduce the crimp of the heat stable fibres in order to minimise the axial extensibility of the fabric when used in a splice case, in which case a heat-stable fibre crimp of not more than 50%, especially not more than 30% and most especially not more than 18% would be preferred. However, as stated above, it is desirable not to have too high a weave density of heat-stable fibres since this will reduce the possible weave density of the recoverable fibres. It has been found that a good compromise is achieved if the product of the heat-recoverable fibre diameter and the weave density of the heat-recoverable fibres is in the range of from 0.4 to 1.3 especially from 0.5 to 1.1.

The heat-recoverable fabric according to the invention has a wide variety of uses. For example it may be recovered over substrates, especially substrates having varying or discontinuous contours, to provide mechanical protection or protection from the environment. The fabric may be used alone when constructed so that the curing renders it substantially impervious to fluids. If desired, the fabric may be impregnated with additional curable adhesive composition, e.g. a curable expoxy composition and especially an optionally B-staged epoxy resin that is cured by means of a polyamide, an anhydride or an isocyanate although other materials may be used such as phenolic resins or isocyanate/-phenolic resin. The resin may alternatively be laminated on to the fabric or it may be employed in particulate form as described in U.K. patent application No.

8224379. Alternatively an adhesive such as a hot-melt adhesive and especially an adhesive based on a polyamide or an ethylene-vinyl acetate copolymer may be applied either to the fabric or to the substrate during installation, if appropriate.

The following examples illustrate fabric members and fabrics according to the invention.

EXAMPLE 1

A monofilament manufactured from a high density polyethylene, Dow Chemicals grade 25057E, was drawn lengthwise by 1200% to a diameter of 0.19 mm. After crosslinking, by irradiation, the fibre was coated with a concentric layer of epoxy, Shell Epikote 1001, to a diameter of 0.7 mm. This coating was applied by passing the fibre through a pre-coated wire coating die. This die was fed with the epoxy by a 32 mm. bore Boughan extruder.

EXAMPLE 2

A monofilament of the Dow material described in Example 1, was coated with a layer of Polyamide (MACROMELT 6301) by using the same process as described in Example 1 to an overall diameter of 0.7 mm.

EXAMPLE 3

A monofilament manufactured from HOSTLAEN GF7750M was drawn 1000% to a diameter of 0.25 mm. After crosslinking by irradiation, the fibre was concentrically coated with an epoxy (Epicote 1001) and a polyamide (MACROMELT 6301) to an overall diameter of 1 mm and an epoxy/polyamide ration of 20/80 by the following process.

The monofilament was drawn through a bath of molten epoxy mounted on the back of a precentred wire coating die and then through the hollow centre pin of the die. This pin acted as a sizing die and controlled the epoxy coating on the monofilament picked up during its passage through it. At the exit from the centre pin, on the front face of the die head a concentric layer of polyamide was extruded over the epoxy/monofilament combination.

EXAMPLE 4

A curable fabric was woven containing equal numbers of the monofilaments produced by Examples 1 and 2.

EXAMPLE 5

A curable fabric was woven from the monofilament of Example 3.

We claim:

1. A fabric comprising dimensionally-recoverable fiber, filament, or yarn fabric members, which fabric carries first and second components of a heat curable composition which can be cured by reaction together of the first and second components when the fabric is heated to a curing temperature, at least the first component being in the form of fiber, filament, or yarn fabric members separate from the dimensionally recoverable fabric members.

2. A fabric according to claim 1, wherein both of the first and second components are in the form of fabric members.

3. A fabric according to claim 1 or 2, wherein the curable component(s) in the form of fabric members is or are incorporated in the fabric with the recoverable fabric members, but are still separate from the recoverable fabric members.

4. A fabric according to claim 1, which comprises fabric members that will recover when heated to a recovery temperature thereof, wherein the recoverable members have a tensile strength of at least 0.1 MPa at their recovery temperature and have been stretched to an extent that will cause the fabric to recover by at least 10%, when heated to the recovery temperature of the recoverable members.

5. A fabric as claimed in claim 1, wherein the recoverable members have a recovery ratio of at least 2:1.

6. A fabric as claimed in claim 1, wherein the curable fabric members are oriented substantially perpendicularly to the dimensionally-recoverable members.

7. A fabric as claimed in claim 1, which is woven so that the weave density of recoverable members is greater than the weave density of curable component fabric members.

8. A fabric as claimed in claim 1, which is woven so that the weave density of recoverable members is less than the weave density of curable component fabric members.

9. A fabric according to claim 1, wherein at least some of the fabric members incorporate a strengthening filament of material other than the said components.

10. A fabric according to claim 1, wherein the curable composition comprises three curable components which are:
   (a) a thermoplastic polyamide having reactive amine groups;
   (b) a thermoplastic copolymer of an alkene with an ethylenically unsaturated ester of an alkanol and a carboxylic acid, the ester having up to 6 carbon atoms, and optionally one or more acidic comonomers; and
   (c) a thermoplastic epoxy resin, at least one of the components (a), (b) and (c) being in the form of fabric members.

11. A fabric according to claim 10, wherein components (a) and (b) are present in a ratio of from 35:65 to 75:25 by weight and component (c) is present in an amount of from 8 to 79 parts per hundred parts of components (a) and (b) by weight.

12. A fabric according to claim 10 or 11, wherein one all three curable components are in the form of fabric members incorporated in the fabric with the recoverable members, but are still separate from the recoverable members.

13. A fabric as claimed in claim 1, wherein one of the reactive components comprises an epoxy resin and the other reactive component comprises a thermoplastic polyamide resin having free amine groups.

14. A fabric as claimed in claim 1, wherein each of the reactive components has a fusion temperature in the range of from 70° to 120° C.

15. A dimensionally recoverable article carrying on at least part of a surface thereof a fabric as claimed in claim 1.

16. An article as claimed in claim 15 which is dimensionally heat-recoverable.

17. An article as claimed in claim 16, wherein each of the reactive components has a fusion temperature that is not more than 50° C. above the recovery temperature of the article.

18. A fabric according to claim 4, wherein the recoverable members have been stretched to an extent that will cause the fabric to recover by at least 40%.

* * * * *